United States Patent
Hoffmann et al.

[11] 3,843,679
[45] Oct. 22, 1974

[54] O-ALKYL-O-[1,3-DISUBSTITUTED-PYRAZOL(5)YL]-(THIONO)-PHOSPHORIC (PHOSPHONIC) ACID ESTERS

[75] Inventors: Hellmut Hoffmann, Wuppertal; Ingeborg Hammann; Wolfgang Behrenz, both of Koeln, all of Germany

[73] Assignee: Bayer Aktiengesellschaft, Leverkusen, Germany

[22] Filed: Apr. 17, 1973

[21] Appl. No.: 351,891

[30] Foreign Application Priority Data
Apr. 21, 1972 Germany.......................... 2219484

[52] U.S. Cl.......... 260/310 R, 260/310 A, 424/200
[51] Int. Cl............................ C07f 9/16, C07f 9/40
[58] Field of Search................................ 260/310 R

[56] References Cited
UNITED STATES PATENTS
3,723,456   3/1973   Fest et al. ...................... 260/310 R
3,763,181   10/1973  Fest et al. ...................... 260/310 R OTHER PUBLICATIONS
Farbenfabriken Bayer A.-G. Chem. Abst. Vol. 74, No. 42383 (1971). QD1.A51.
Pudovik et al. Chem. Abst. Vol. 77, No. 48589r (1972). QD1.A51.

*Primary Examiner*—Natalie Trousof
*Attorney, Agent, or Firm*—Burgess, Dinklage & Sprung

[57] ABSTRACT

O-alkyl-O-[1,3-disubstituted-pyrazol(5)yl]-(thiono)-phosphoric (phosphonic) acid esters of the general formula

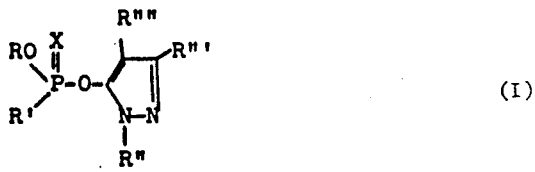

(I)

in which
R is alkyl of one to six carbon atoms,
R' is alkyl or alkoxy of one to six carbon atoms or phenyl,
R'' is lower alkyl, cyano-lower alkyl or 1,1-dioxythiolane,
R''' is carbalkoxy, carbamoyl, monoalkylcarbomoyl or dialkylcarbamoyl,
R'''' is hydrogen, chlorine or alkyl or one to six carbon atoms, and
X is oxygen or sulfur,
which possess insecticidal, acaricidal and fungicidal properties.

7 Claims, No Drawings

O-ALKYL-O-[1,3-DISUBSTITUTED-PYRAZOL(5)YL]-(THIONO)-PHOSPHORIC (PHOSPHONIC) ACID ESTERS

The present invention relates to and has for its objects the provision of particular new 0-alkyl-0-[1,3-disubstituted-pyrazol( 5)yl]-(thiono)-phosphoric (phosphonic) acid esters which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It is known from German Published Specification DOS 2,037,853 and USA Patent specification No. 2,754,244 that pyrazolothionophosphoric acid esters, for example O,O-dimethyl- (Compound A) or O,O-diethyl-O-[1-methyl-4-cyano-5-methylmercaptopyrazolyl(3)]-(Compound B) or O,O-diethyl-O-[3-methyl-pyrazolyl(5)]-thionophosphoric acid esters (Compound C), possess insecticidal and acaricidal properties.

The present invention provides Opyrazolo(thiono)-phosphoric(phosphonic) acid esters of the general formula

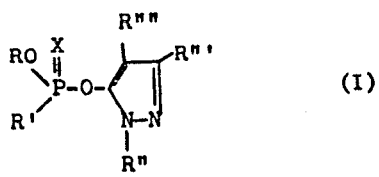

in which
R is alkyl of one to six carbon atoms,
R' is alkyl or alkoxy of one to six carbon atoms or phenyl,
R'' is lower alkyl, cyano-lower alkyl or 1,1-dioxythiolane,
R''' is carbalkoxy, carbamoyl, monoalkylcarbamoyl or dialkylcarbamoyl,
R'''' is hydrogen, chlorine or alkyl of one to six carbon atoms, and
X is oxygen or sulfur.

Preferably, R is lower alkyl of one to four carbon atoms, R' is lower alkyl or alkoxy or phenyl, R'' is lower alkyl of one to four carbon atoms, cyanoethyl, 2-cyanopropyl or 1,1-dioxythiolane, R''' is carbo-lower alkoxy such as carbomethoxy, carboethoxy or carboisopropoxy, carbamoyl or mono- or di-lower alkylcarbamoyl with up to three carbon atoms in each alkyl radical, and R'''' is hydrogen, chlorine or lower alkyl such as methyl or ethyl.

Surprisingly, the 0-pyrazolo-(thiono)-phosphoric(-phosphonic) acid esters according to the invention possess a substantially higher insecticidal and acaricidal action than previously known compounds of analogous structure and similar type of action. They have in particular proved of value in combating hygiene pests and pests of stored products. The products according to the invention thus represent a genuine enrichment of the art. Furthermore they contribute to satisfying the great demand for constantly new active compounds in the field of pesticides. The latter results from the fact that the commercially available agents have to meet constantly higher standards, especially in respect of the protection of the environment, such as low toxicity to warm-blooded animals and low phytotoxicity, rapid degradation in and on the plant with short minimum intervals to be observed between spraying with pesticide and harvesting, and activity against resistant pests.

The present invention also provides a process for the production of an 0-pyrazolo(thiono)-phosphoric(phosphonic) acid ester of the formula (I) in which a. a (thiono)phosphoric(phosphonic) acid ester halide of the general formula

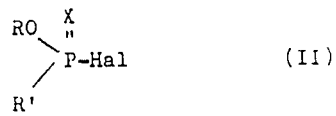

is reacted with a pyrazole derivative of the general formula

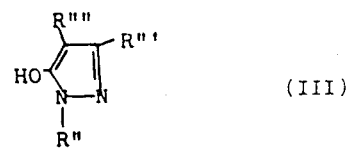

in the presence of an acid-binding agent or in the form of an alkali metal, alkaline earth metal or ammonium salt, or b. a trialkylphosphite of the general formula

is reacted with a pyrazole derivative of the general formula

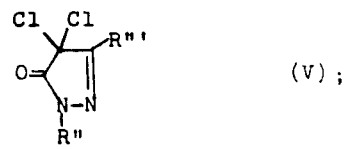

in which formulae (II) to (V)
R, R', R'', R''', R'''' and X have the abovementioned meanings, and
Hal is a halogen atom.

If 0-ethyl-thiono-ethanephosphonic acid ester chloride and 1-methyl-3-carbethoxy-4-chloro-5-hydroxypyrazole or triethylphosphite and 1-methyl-3-carbethoxy-4,4-dichloropyrazolinone(5) are used as the starting substances, the course of the reaction can be represented by the following formula schemes:

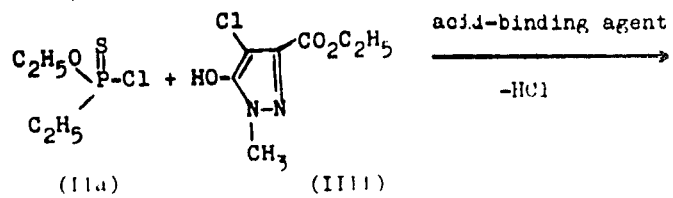

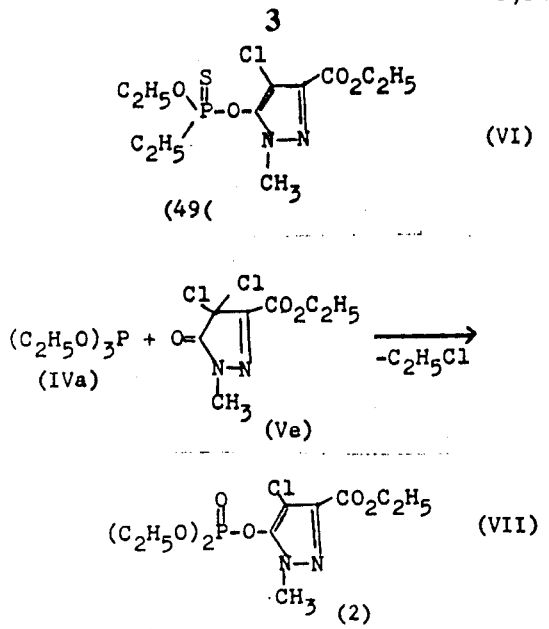

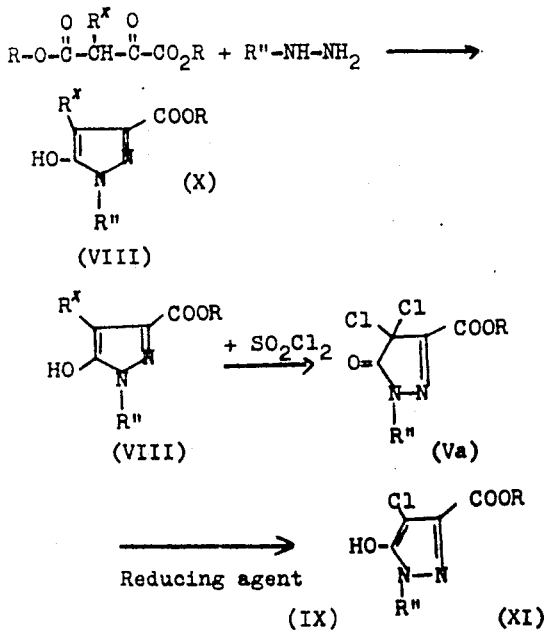

The pyrazole derivatives of the formula (III) or (V) required as starting substances can, for example, be prepared as follows: starting from the corresponding oxalcarboxylic acid esters and substituted hydrazines, pyrazoles of the structure (VIII) are obtained, which can be converted, for example with sulfuryl chloride, into the dichlorinated compounds which can then in turn optionally be reduced with reducing agents, for example bisulfite, to the 4-chloro-5-hydroxypyrazole derivatives of the structure (IX):

R" has the above mentioned meaning and $R^x$ denotes hydrogen or alkyl with one to six carbon atoms.

In the pyrazoles (IX) thus obtained it is possible, for example, to trans-esterify the carbalkoxy group or to convert it by means of ammonia or primary or secondary amines into an optionally monosubstituted or disubstituted carbamoyl group.

The following may be mentioned individually as examples of pyrazole derivatives to be employed: 1-methyl-, 1-ethyl-, 1-n-propyl-, 1-iso-propyl-, 1-cyanoethyl-, 1-(2'-cyanopropyl)- or 1-(1', 1'-dioxythiolane)-3-carbomethoxy- or -3-carboethoxy-, -3-carbo-n-propoxy-, -3-carbo-isopropoxy-, -3-carbamoyl-, -3-N-methyl-, -3-N-ethyl, -3-N-n-propyl-, -3-N-iso-propyl-, -3-N,N-dimethyl-, -3-N,N-diethyl- or -3-N,N-dipropyl-carbamoyl- 5-hydroxypyrazole, and also the corresponding derivatives substituted in the 4-position by chlorine, methyl or ethyl, as well as the corresponding 4,4-dichloropyrazolinone(5) derivatives.

As examples of (thiono)-phosphoric(phosphonic) acid ester halides to be reacted in the process there may be mentioned: 0,0-dimethyl-, 0,0-diethyl-, 0,0-di-n-propyl-, 0,0-di-isopropyl, 0,0-di-n-butyl-, 0,0-di-sec.-butyl-, 0,0-di-isobutyl- and 0,0-di-tert.-butyl-phosphoric acid ester chloride and the corresponding thiono analogues, and also 0-methyl-, 0-ethyl-, 0-n-propyl-, 0-iso-propyl-, 0-n-butyl-, 0-sec.-butyl-, 0-iso-butyl-, 0-tert.-butyl-methane-, -ethane-, -propane-, -butane- or -phenyl-phosphoric acid ester chloride as well as the corresponding thiono analogues.

The process of the invention is preferably carried out in the presence of a solvent or diluent. As such, practically all inert solvents can be used. These include, in particular, aliphatic and aromatic optionally chlorinated hydrocarbons. The process variant (a) is preferably carried out in benzene, toluene, xylene, benzine, methylene chloride, chloroform, carbon tetrachloride, chlorobenzene, an ether, such as diethyl ether or dibutyl ether or dioxane, or a ketone, for example acetone, methyl ethyl ketone, methyl isopropyl ketone or methyl isobutyl ketone, or a nitrile, such as acetonitrile or propionitrile, while the process variant (b) is preferably allowed to take place in benzene, toluene, xylene, benzine, an ether, for example diethyl ether or dibutyl ether or dioxane, or a ketone, such as acetone, methyl ethyl ketone, methyl isopropyl ketone or methyl isobutyl ketone, or a nitrile, such as acetonitrile or propionitrile.

All customary acid-binding agents can be used as acid acceptors in process variant (a). Alkali metal carbonates and alkali metal alcoholates, such as sodium and potassium carbonate, sodium and potassium methylate and sodium and potassium ethylate have proved particularly suitable, as have aliphatic, aromatic or heterocyclic amines, for example triethylamine, dimethylamine, dimethylaniline, dimethylbenzylamine and pyridine.

The reaction temperatures can be varied over a wide range. In general the reaction is carried out at about 0 to 120, preferably about 25° to 80°C.

The reaction is generally carried out under normal pressure.

To carry out the process, the starting substances are generally employed in equimolar ratios. The reactions are preferably carried out in the presence of one of the abovementioned solvents at the indicated temperatures, and in the case of process variant (a) additionally, if appropriate, in the presence of an acid acceptor. After several hours' reaction, in most cases at elevated temperatures while stirring, the reaction mixture may be worked up in the usual manner.

The compounds according to the invention are in most cases obtained in the form of oils, some of which can not be distilled without decomposition but can be freed of the last volatile constituents by so-called "slight distillation," that is to say prolonged heating under reduced pressure to moderately elevated temperatures, and can be purified in this manner. They are characterized by their refractive indexes Some of the products are obtained in the form of crystalline compounds of sharp melting point.

As has already been mentioned, the new 0-pyrazolo(thiono)-phosphoric(phosphonic) acid esters are distinguished by an excellent insecticidal and acaracidal activity against plant pests, hygiene pests and pests of stored products. They possess a good action both against sucking and against biting insects and mites (*Acarina*). At the same time they display a low phytotoxicity accompanied, in some cases, by a fungicidal action.

For these reasons, the compounds according to the invention can be employed successfully as pesticides in plant protection and the protection of stored products, and in the hygiene field.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korzchelti*), the rosy apple aphid (*Sappaphis mali*), the mealy plum aphid (*Hyalopterus arundinis*) and the cherry blackfly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudoccus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (*Coleoptera*), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the Khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living the the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*).

The *Diptera* comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the two-spotted spider mite (*Tetranychus urticae*) and the European red mite (*Paratetranychus pilosus* = *Panonychus ulmi*), gall mites, for example the black-currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carries optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents, The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ehtanol, propanol, butanol, glycol, etc.) as well as ethers and esters thereof (e.g.

glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, and fungicides, or rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, acarids and fungi, and more particularly methods of combating at least one of insects and acarids, which comprises applying to at least one of correspondingly (a) such insects, (b) such acarids, (c) such fungi, and (d) the corresponding habitat thereof, i.e. the locus to be protected, a correspondingly combative or toxic amount, i.e. an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

The pyrazole derivatives of the formula (III) or (V) required as starting materials can be prepared, for example, as follows:

a) 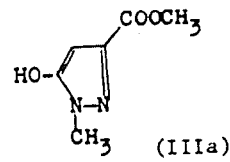

(IIIa)

90 ml of pure concentrated hydrochloric acid were added to a mixture of 182 g (1mole) of the sodium salt of oxalacetic acid dimethyl ester and 46 g (1 mole) of methylhydrazine in 500 ml of methanol, in the course of which the internal temperature rose to 40° – 50°C. After stirring for 3 hours, the volatile constituent was evaporated off and the residue was triturated with water, filtered off, dried and recrystallized from acetonitrile. 77g (50 percent of theory) of 1-methyl-3-carbomethoxy-5-hydroxypyrazole of melting point 194° to 196°C were obtained.

b) 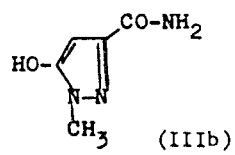

(IIIb)

16 g (0.1 mole) of 1-methyl-3-carbomethoxy-5-hydroxypyrazole and 100 ml of approximately 26 percent strength ammonium hydroxide solution were stirred for 48 hours at room temperature. Thereafter the excess ammonia was stripped off under reduced pressure, the reaction mixture was diluted with water, clarified and acidified with 10 ml of pure concentrated hydrochloric acid and the precipitate formed was subsequently filtered off and dried on clay. 9 g (64 percent of theory) of 1-methyl-3-carbamoyl-5-hydroxypyrazole of melting point 262°C (with decomposition) were obtained.

c) 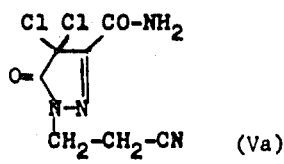 (Va)

81 g of sulfuryl chloride were added dropwise, while stirring, to a solution of 54 g (0.3 mole) of 1-cyanoethyl-3-carbamoyl-5-hydroxypyrazole in 800 ml of methylene chloride, in the course of which the temperature rose to 35° – 40°C. Thereafter the reaction mixture was boiled for 6 hours under reflux, cooled and freed of impurities and the solvent was then evaporated off under reduced pressure and the residue recrystallized from an ethyl acetate-ligroin mixture. 44 g (59 percent of theory) of 1-cyanoethyl-3-carbamoyl-4,4-dichloropyrazolone (5) of melting point 122°C were thus obtained.

d) 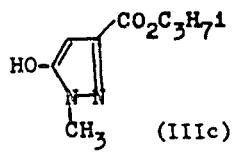 (IIIc)

Hydrogen chloride was slowly passed into a mixture of 34g (0.2 mole) of 1-methyl-3-carboethoxy-5-hydroxypyrazole in 350 ml of isopropanol at 75° – 80°C. After about 5 hours the mixture was concentrated under reduced pressure, the residue was dissolved in sodium hydroxide solution, the solution was filtered and treated with glacial acetic acid and the precipitate was filtered off, washed with water and dried on clay. 20 g (54 percent of theory) of 1-methyl-3-carboisopropoxy-5-hydroxypyrazole of melting point 153°C were obtained.

The following compounds were prepared analogously:

Table 1

| Structure | Melting point °C |
|---|---|
| (IIIa) | 165 – 166°C |
| (IIIe) | 147°C |
| (IIIf) | 142°C |
| (IIIg) | 180 – 182°C |
| (IIIh) | 154 – 156°C |
| (IIIj) | 130°C |
| (IIIk) | 138°C |
| (IIIl) | 174°C |
| (IIIm) | 170°C |
| (IIIn) | 186°C |
| (IIIo) | 160 – 165°C |

Table 1—Continued

| Structure | | Melting point °C |
|---|---|---|
| (pyrazole with HO–, CO–NH–CH₃, N–N, CH₃) | (IIIp) | 194 – 196°C |
| (pyrazole with HO–, Cl, CO–NH–CH₃, N–N, CH₃) | (IIIq) | 159°C |
| (pyrazole with HO–, CO–NH–CH₃, N–N, CH₂–CH₂–CN) | (IIIr) | 200 – 202°C |
| (pyrazole with HO–, CO–NH–CH₃, N–N, SO₂ ring) | (IIIs) | 243°C |
| (pyrazole with HO–, CO–NH₂, N–N, CH₂–CH₂–CN) | (IIIu) | 197 – 200°C |
| (pyrazole with HO–, Cl, CO–NH₂, N–N, CH₂–CH₂–CN) | (IIIv) | 156°C |
| (pyrazole with HO–, Cl, CO–NH₂, N–N, CH₃) | (IIIw) | 166°C |
| (pyrazolone with Cl, Cl, COOCH₃, O=, N–N, CH₃) | (Vb) | 56°C |
| (pyrazolone with Cl, Cl, COOC₂H₅, O=, N–N, SO₂ ring) | (Vc) | 136°C |
| (pyrazolone with Cl, Cl, COOC₂H₅, O=, N–N, CH₂–CH₂–CN) | (Vd) | 81°C |
| (pyrazolone with Cl, Cl, COOC₂H₅, O=, N–N, CH₃) | (IIIl) | 36°C |

EXAMPLE 2

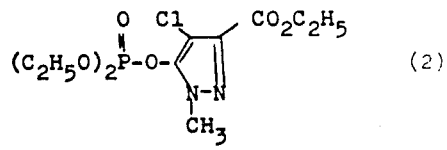

(1)

19 g (0.1 mole) of O,O-diethylthionophosphoric acid diester chloride were added to a mixture of 17.6 g (0.1 mole) of 1-methyl-3-carbamoyl-4-chloro-5-hydroxy-pyrazole and 15 g of potassium carbonate in 100 ml of acetonitrile and the mixture was subsequently warmed to 80°C for 8 hours, while stirring. The reaction mixture was then cooled, poured into water and extracted by shaking with benzene, the organic phase was washed with water, the solvent was distilled off under reduced pressure and the residue was recrystallized from ethyl acetate. 12 g (37 percent of theory) of O,O-diethyl-O-[1-methyl-3-carbamoyl-4-chloro-pyrazolyl(5)]-thionophosphoric acid ester of melting point 132°C were obtained.

EXAMPLE 3

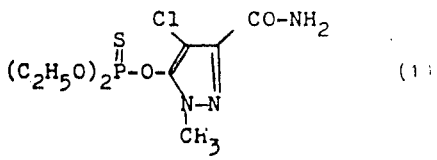

(2)

33 g (0.2 mole) of triethylphosphite were added dropwise, while stirring, to a solution of 48 g (0.2 mole) of 1-methyl-3-carboethoxy-4,4-dichloro-pyrazolone(5) in 300 ml of benzene, in the course of which the temperature of the mixture rose to 30° – 40°C. Thereafter the reaction mixture was stirred for a further hour, the solvent was distilled off, the residue was dissolved in benzene, the organic phase was washed with water and dried and the solvent was distilled off under reduced pressure, whereupon the residue solidified. 61 g (90 percent of theory) of O,O-diethyl-O-[1-methyl-3-carboethoxy-4-chloropyrazol(5)yl]-phosphoric acid ester of melting point 34°C were obtained.

EXAMPLE 4

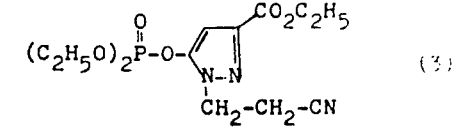

(3)

35 g (0.2 mole) of O,O-diethylphosphoric acid diester chloride were added dropwise, while stirring, to a mixture of 42 g (0.2 mole) of 1-cyanoethyl-3-carboethoxy-5-hydroxypyrazole and 30 g of potassium carbonate in 300 ml of acetonitrile, in the course of which the temperature of the mixture rose to 35°C. Thereafter the batch was heated to 40° – 45°C for 4 hours while stirring, cooled and poured into water, the mixture was extracted by shaking with benzene, the organic phase was washed with water until a neutral reaction was obtained and was dried, the solvent was removed under reduced pressure and the residue was subjected to "slight distillation." 48 g (70 percent of theory) of 0,0-diethyl-0-[1-cyanoethyl-3-carboethoxypyrazol(5)yl]-phosphoric acid ester of refractive index $n_D^{23} = 1.4791$ remained.

The following compounds were prepared analogously to those of the preceding Examples:

Table 2

| Structure | Physical properties (refractive index, melting point °C) |
|---|---|
| 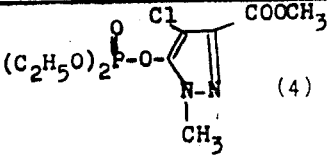 (4) | $n_D^{24} = 1.4809$ |
| 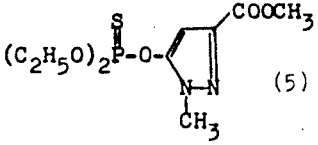 (5) | $n_D^{25} = 1.4994$ |
| 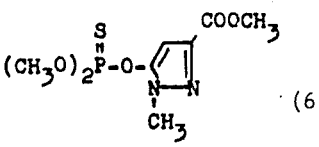 (6) | melting point 50 – 52°C |
| 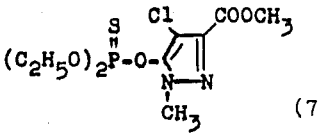 (7) | melting point 48°C |
| 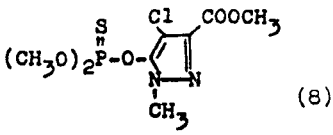 (8) | melting point 68°C |
| 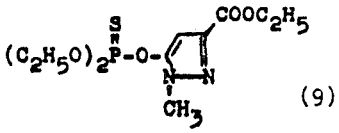 (9) | $n_D^{22} = 1.4952$ |
| 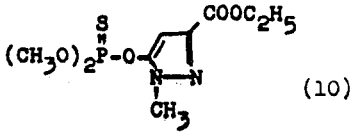 (10) | $n_D^{24} = 1.4996$ |
| 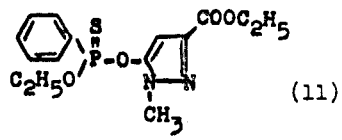 (11) | $n_D^{22} = 1.5552$ |
| 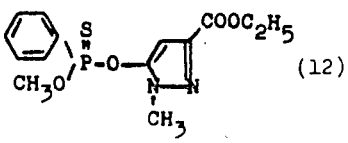 (12) | $n_D^{22} = 1.5618$ |

TABLE 2—Continued
| Structure (continued) | Physical properties (refractive index, melting point °C) |
|---|---|
| 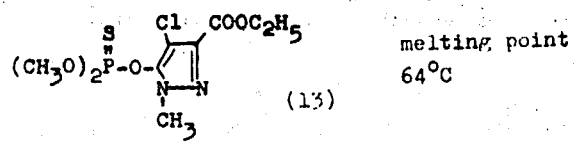 (13) | melting point 64°C |
| 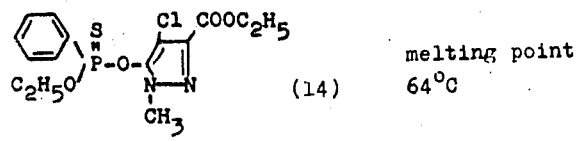 (14) | melting point 64°C |
| 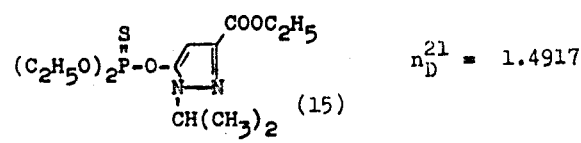 (15) | $n_D^{21}$ = 1.4917 |
| 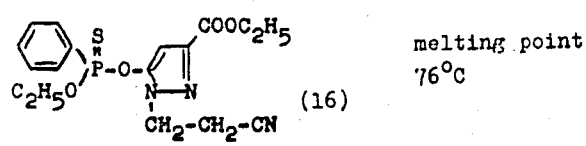 (16) | melting point 76°C |
| 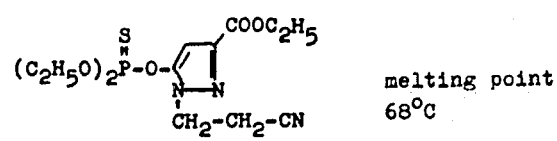 (17) | melting point 68°C |
| 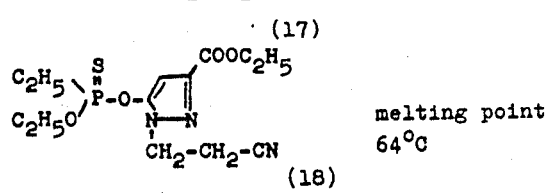 (18) | melting point 64°C |
| 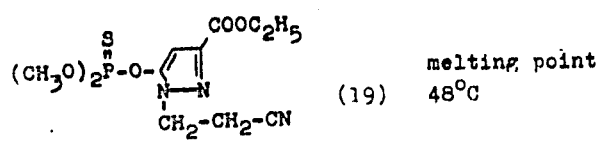 (19) | melting point 48°C |
| 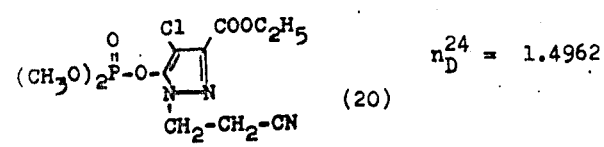 (20) | $n_D^{24}$ = 1.4962 |
| 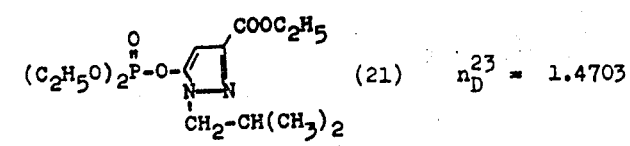 (21) | $n_D^{23}$ = 1.4703 |
| 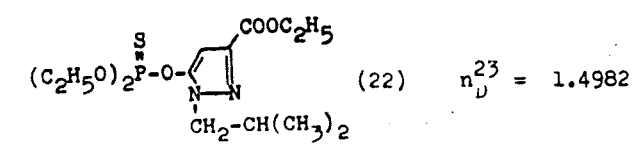 (22) | $n_D^{23}$ = 1.4982 |

TABLE 2—Continued
| Structure (continued) | | Physical properties (refractive index, melting point °C) |
|---|---|---|
| 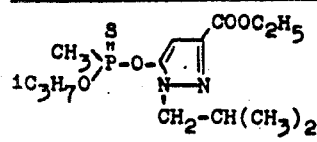 | (23) | $n_D^{23} = 1.5042$ |
| 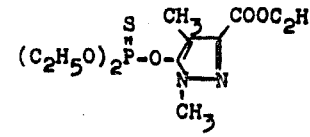 | (24) | $n_D^{24} = 1.4972$ |
| 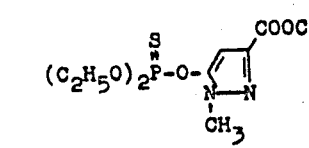 | (25) | $n_D^{24} = 1.4930$ |
| 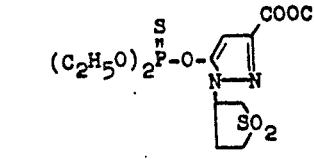 | (26) | $n_D^{24} = 1.5172$ |
| 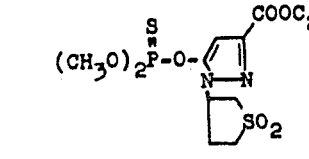 | (27) | $n_D^{22} = 1.5292$ |
| 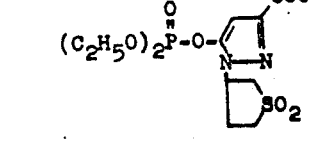 | (28) | $n_D^{22} = 1.4990$ |
| 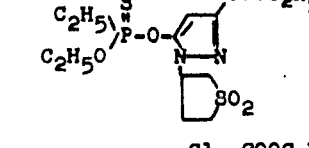 | (29) | melting point 86 – 90°C |
| 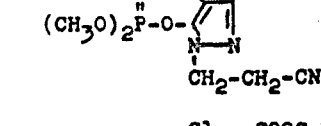 | (30) | melting point 68°C |
| 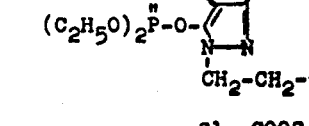 | (31) | melting point 52°C |
| 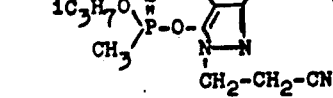 | (32) | $n_D^{25} = 1.5202$ |

TABLE 2—Continued
| Structure (continued) | Physical properties (refractive index, melting point °C) |
|---|---|
| 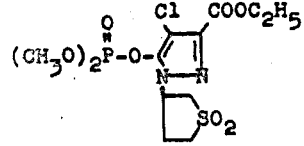 (33) | melting point 103°C |
| 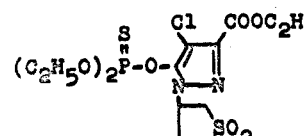 (34) | $n_D^{24}$ = 1.5270 |
| 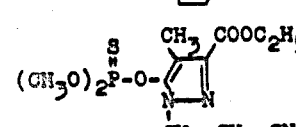 (35) | melting point 67°C |
| 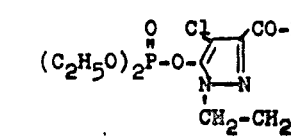 (36) | melting point 115 – 117°C |
| 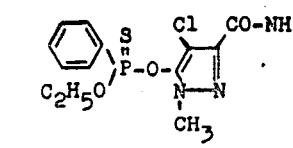 (37) | melting point 141°C |
| 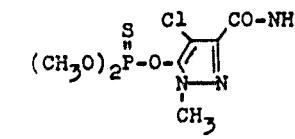 (38) | melting point 137°C |
| 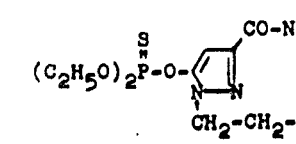 (39) | $n_D^{20}$ = 1.5117 |
| 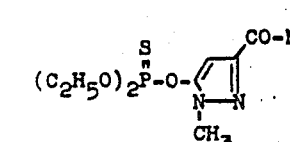 (40) | melting point 114 – 116°C |
| 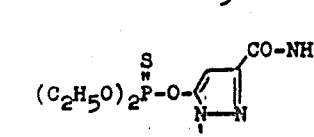 (41) | melting point 47°C |
| 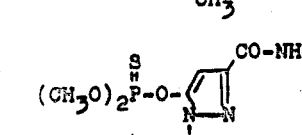 (42) | melting point 69 – 70°C |

TABLE 2—Continued

| Structure (continued) | Physical properties (refractive index, melting point °C) |
|---|---|
| 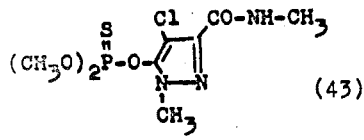 (43) | melting point 86 – 87°C |
| 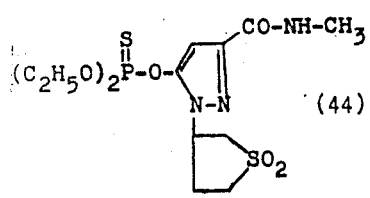 (44) | melting point 117 – 119°C |
| 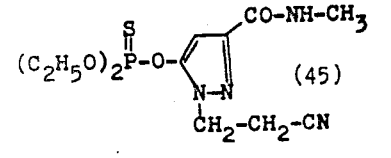 (45) | melting point 70°C |
| 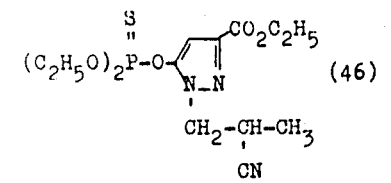 (46) | $n_D^{23} = 1.4982$ |
| 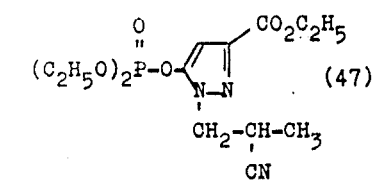 (47) | $n_D^{23} = 1.4703$ |
| 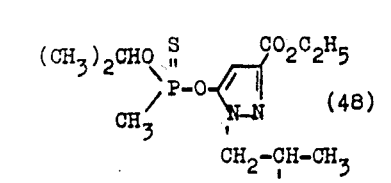 (48) | $n_D^{23} = 1.5042$ |

*Plutella* test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100 percent means that all the caterpillars were killed whereas 0 percent means that none of the caterpillars were killed.

The active compounds, the concentrations of the active compounds, the evaluation times and the results can be seen from the following Table 3:

Table 3

(Plutella test)

| Active compound | Active compound concentration in % by weight | Degree of destruction in % after 3 days |
|---|---|---|
| 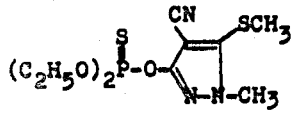 (known) (B) | 0.1<br>0.01<br>0.001 | 100<br>40<br>0 |
| (6) | 0.1<br>0.01<br>0.001 | 100<br>100<br>30 |
| (5) | 0.1<br>0.01<br>0.001 | 100<br>100<br>45 |
| (11) | 0.1<br>0.01<br>0.001 | 100<br>100<br>30 |
| (25) | 0.1<br>0.01<br>0.001 | 100<br>100<br>60 |
| (8) | 0.1<br>0.01<br>0.001 | 100<br>100<br>35 |
| (7) | 0.1<br>0.01<br>0.001 | 100<br>100<br>35 |
| (13) | 0.1<br>0.01<br>0.001 | 100<br>100<br>35 |
| (18) | 0.1<br>0.01<br>0.001 | 100<br>100<br>50 |
| (38) | 0.1<br>0.01<br>0.001 | 100<br>100<br>45 |
| (37) | 0.1<br>0.01<br>0.001 | 100<br>100<br>85 |

EXAMPLE 6

*Phaedon* larvae test
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were then infested with mustard beetle larvae (*Phaedon cochleariae*).

After the specified periods of time, the degree of destruction was determined in percent. Here, 100 percent means that all beetle larvae were killed. 0 percent means that none of the beetle larvae were killed.

The active compounds, the concentrations of the active compounds, the times of evaluation and the results can be seen from the following Table 4:

Table 4

(Phaedon larvae test)

| Active compound | Active compound concentration in % by weight | Degree of destruction in % after 3 days |
|---|---|---|
| (CH$_3$O)$_2$P(S)-O-[pyrazole with CN, SCH$_3$, N-N-CH$_3$] (known) (A) | 0.1<br>0.01<br>0.001 | 100<br>100<br>0 |
| (C$_2$H$_5$O)$_2$P(S)-O-[pyrazole with CN, SCH$_3$, N-N-CH$_3$] (known) (B) | 0.1<br>0.01<br>0.001 | 100<br>100<br>0 |
| (C$_2$H$_5$O)$_2$P(S)-O-[pyrazole with CH$_3$, N-NH] (known) (C) | 0.1<br>0.01<br>0.001 | 100<br>100<br>0 |
| (41) | 0.1<br>0.01<br>0.001 | 100<br>100<br>100 |
| (13) | 0.1<br>0.01<br>0.001 | 100<br>100<br>70 |
| (31) | 0.1<br>0.01<br>0.001 | 100<br>100<br>100 |
| (16) | 0.1<br>0.01<br>0.001 | 100<br>100<br>90 |
| (46) | 0.1<br>0.01<br>0.001 | 100<br>100<br>100 |

Example 7

*Myzus* test (contact action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100 percent means that all the aphids were killed whereas 0 percent means that none of the aphids were killed.

The active compounds, the concentrations of the active compounds, the evaluation times and the results can be seen from the following Table 5:

Table 5

(Myzus test)

| Active compound | Active compound concentration in % by weight | Degree of destruction in % after 1 day |
|---|---|---|
| $(C_2H_5O)_2\overset{S}{\underset{\|}{P}}-O-\underset{\underset{H}{N-N}}{\overset{CH_3}{\diagdown}}$ (known) (C) | 0.1<br>0.01<br>0.001 | 99<br>40<br>0 |
| (42) | 0.1<br>0.01<br>0.001 | 100<br>98<br>65 |
| (41) | 0.1<br>0.01<br>0.001<br>0.0001 | 100<br>100<br>100<br>50 |
| (6) | 0.1<br>0.01<br>0.001<br>0.0001 | 100<br>100<br>99<br>40 |
| (5) | 0.1<br>0.01<br>0.001<br>0.0001 | 100<br>100<br>99<br>40 |
| (10) | 0.1<br>0.01 | 100<br>98 |
| (12) | 0.1<br>0.01 | 100<br>98 |
| (11) | 0.1<br>0.01<br>0.001 | 100<br>100<br>60 |
| (25) | 0.1<br>0.01<br>0.001<br>0.0001 | 100<br>100<br>100<br>40 |
| (8) | 0.1<br>0.01 | 100<br>100 |
| (7) | 0.1<br>0.01<br>0.001 | 100<br>99<br>60 |
| (4) | 0.1<br>0.01 | 100<br>98 |
| (24) | 0.1<br>0.01 | 100<br>100 |
| (15) | 0.1<br>0.01<br>0.001 | 100<br>100<br>98 |
| (18) | 0.1<br>0.01<br>0.001 | 100<br>100<br>30 |
| (46) | 0.1<br>0.01 | 100<br>98 |

Table 5 (continued)

(Myzus test)

| Active compound | Active compound concentration in % by weight | Degree of destruction in % after 1 day |
|---|---|---|
| (47) | 0.1 | 100 |
|  | 0.01 | 90 |
| (9) | 0.1 | 100 |
|  | 0.01 | 100 |
|  | 0.001 | 99 |
| (40) | 0.1 | 100 |
|  | 0.01 | 98 |
|  | 0.001 | 92 |
| (1) | 0.1 | 100 |
|  | 0.01 | 95 |
| (39) | 0.1 | 100 |
|  | 0.01 | 100 |
|  | 0.001 | 65 |

EXAMPLE 8

Tetranychus test (resistant)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (Phaseolus vulgaris) which had a height of approximately 10 – 30 cm were sprayed with the preparation of the active compound until dripping wet. These bean plants were heavily infested with all stages of development of the two-spotted spider mite (Tetranychus urticae).

After the specified periods of time, the effectiveness of the preparation of active compound was determined by counting the dead mites. The degree of destruction thus obtained was quoted in percent. 100 percent means that all the spider mites were killed and 0 percent means that none of the spider mites were killed.

The active compounds, the concentrations of the active compounds, the evaluation times and the results can be seen from the following Table 6:

Table 6

(Tetranychus test/resistant)

| Active compound | Active compound concentration in % by weight | Degree of destruction in % after 2 days |
|---|---|---|
| 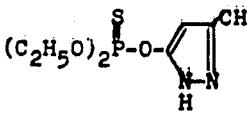 (known) (C) | 0.1 | 50 |
|  | 0.01 | 0 |
| (42) | 0.1 | 90 |
|  | 0.01 | 90 |
| (41) | 0.1 | 98 |
|  | 0.01 | 70 |
| (4) | 0.1 | 99 |
| (48) | 0.1 | 100 |
| (28) | 0.1 | 98 |
| (40) | 0.1 | 95 |
|  | 0.01 | 85 |
| (36) | 0.1 | 100 |

EXAMPLE 9

LT$_{100}$ test for Diptera
Test insects: *Musca domestica*
Solvent: Acetone 2 parts by weight of active compound were dissolved in 1,000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was continuously observed. The time which was necessary for a 100 percent knock down effect was determined.

The test insects the active compounds, the concentrations of the active compounds and the periods of time at which there is a 100 percent knock down effect can be seen from the following Table 7:

Table 7
(LT$_{100}$ test for Diptera)

| Active compound | Active compound concentration of the solution in % w/v | LT$_{100}$ |
|---|---|---|
| 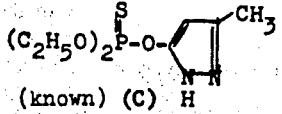 (known) (C) | 0.2<br>0.02 | 105'<br>6 hrs = 75% |
| 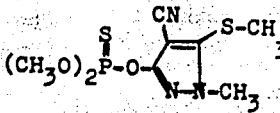 (known) (A) | 0.2<br>0.02 | 300'<br>8 hrs = 0% |
| 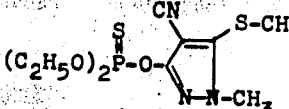 (known) (B) | 0.2<br>0.02 | 6 hrs<br>8 hrs = 70% |
| (3) | 0.2<br>0.02<br>0.002 | 120'<br>160'<br>210' |
| (28) | 0.2<br>0.02<br>0.002 | 80'<br>160'<br>6 hrs |
| (47) | 0.2<br>0.02<br>0.002 | 105'<br>130'<br>6 hrs |
| (2) | 0.2<br>0.02<br>0.002 | 60'<br>75'<br>8 hrs |
| (20) | 0.2<br>0.02 | 70'<br>150' |
| (34) | 0.2<br>0.02 | 90'<br>130' |
| (4) | 0.2<br>0.02<br>0.002 | 85'<br>190'<br>6 hrs = 60% |

EXAMPLE 10

$LT_{100}$ test for Diptera
Test insects: *Aedes aegypti*
Solvent: Acetone 2 parts by weight of active compound were dissolved in 1,000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test animals was continuously observed. The time which was necessary for a 100 percent knock down effect was determined.

The test insects the active compounds, the concentrations of the active compounds and the periods of time at which there is a 100 percent knock down effect can be seen from the following Table 8:

Table 8

($LT_{100}$ test for Diptera)

| Active compounds | Active compound concentration of the solution in % w/v | $LT_{100}$ |
|---|---|---|
| $(C_2H_5O)_2\overset{S}{\overset{\|}{P}}-O-\underset{\underset{H}{N-N}}{\diagup}CH_3$ (known) (C) | 0.2 | 180' |
| $(CH_3O)_2\overset{S}{\overset{\|}{P}}-O-\underset{\underset{CH_3}{N-N}}{\overset{CN}{\diagup}}S-CH_3$ (known) (A) | 0.2 | 180' |
| (3) | 0.2<br>0.02 | 120'<br>180' |
| (28) | 0.2<br>0.02 | 60'<br>120' |
| (47) | 0.2<br>0.02 | 120'<br>180' |
| (2) | 0.2<br>0.02 | 60'<br>120' |
| (20) | 0.2<br>0.02<br>0.002 | 60'<br>120'<br>3 hrs = 40% |
| (10) | 0.2<br>0.02 | 120'<br>180' |
| (24) | 0.2<br>0.02 | 120'<br>180' |
| (44) | 0.2<br>0.02 | 120'<br>180' |
| (25) | 0.2<br>0.02 | 60'<br>120' |
| (5) | 0.2<br>0.02 | 60'<br>120' |
| (6) | 0.2<br>0.02 | 60'<br>120' |
| (4) | 0.2<br>0.02 | 60'<br>120' |

EXAMPLE 11

LD$_{100}$ test
Test insects: *Sitophilus granarius*
Solvent: Acetone 2 parts by weight of the active compound were taken up in 1,000 parts by volume of solvent. The solution so obtained was diluted with further solvent to the desired concentrations.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per m$^2$ of filter paper varied with the concentration of the solution of the active compound. About 25 test insects were then placed in the Petri dish and it was covered with a glass lid.

The condition of the test insects was observed 3 days after the commencement of the experiments. The destruction in percent was determined.

The active compounds, the concentrations of the active compounds, the test insects and the results can be seen from the following Table 9:

It will be appreciated that the instant specification and examples are set forth by way of illustration and not limitation, and that various modifications and changes may be made without departing from the spirit and scope of the present invention.

What is claimed is:

1. An 0-pyrazolo(thiono)-phosphoric(phosphonic) acid ester of the formula

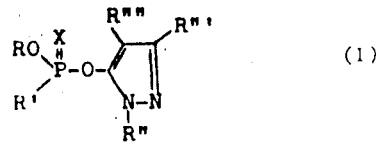

(1)

in which
R is alkyl of one to six carbon atoms,
R' is alkyl or alkoxy of one to six carbon atoms or phenyl,
R'' is lower alkyl, cyano-lower alkyl or 1,1-dioxythiolane,
R''' is carbo-lower alkoxy, carbamoyl, mono-lower alkylcarbamoyl or di-lower alkylcarbamoyl,

Table 9
(LD$_{100}$ test)

| Active compound | Active compound concentration of the solution in % w/v | Destruction in % |
|---|---|---|
| (C$_2$H$_5$O)$_2$P(S)-O-[pyrazole-CH$_3$] (known) (C) | 0.2<br>0.02 | 100<br>0 |
| (19) | 0.2<br>0.02 | 100<br>100 |
| (13) | 0.2<br>0.02<br>0.002 | 100<br>100<br>35 |
| (10) | 0.2<br>0.02 | 100<br>60 |
| (24) | 0.2<br>0.02 | 100<br>70 |
| (25) | 0.2<br>0.02 | 100<br>100 |
| (42) | 0.2<br>0.02 | 100<br>100 |
| (5) | 0.2<br>0.02 | 100<br>100 |
| (6) | 0.2<br>0.02 | 100<br>100 |
| (4) | 0.2<br>0.02 | 100<br>80 |

R'''' is hydrogen, chlorine or alkyl of one to six carbon atoms, and
X is oxygen or sulfur.

2. A compound according to claim 1 in which R is alkyl of one to four carbon atoms, R' is alkyl or alkoxy of up to four carbon atoms or phenyl, R'' is alkyl of one to four carbon atoms, cyanoethyl, 2-cyanopropyl or 1,1-dioxythiolane, R''' is carbomethoxy, carboethoxy, carboisopropoxy, carbamoyl or mono- or dialkylcarbamoyl of up to three carbon atoms in each alkyl radical, and R'''' is hydrogen, chlorine, methyl or ethyl.

3. A compound according to claim 1 wherein such compound is 0,0-dimethyl-0-[1-methyl-3-CARBOMETHOXYPYRAZOL(5)yl]-thionophosphoric acid ester of the formula

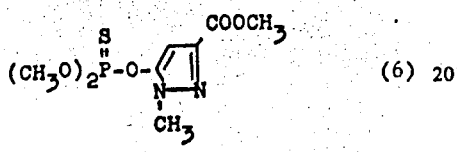

(6)

4. A compound according to claim 1 wherein such compound is 0,0-dimethyl-0-[1-methyl-3-carboethoxy-4-chloropyrazol(5)yl]-thionophosphoric acid ester of the formula

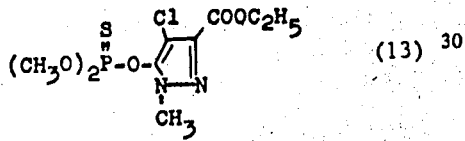

(13)

5. A compound according to claim 1 wherein such compound is 0,0-diethyl-0-[1-methyl-3-carboisopropoxypyrazol(5)yl]-thionophosphoric acid ester of the formula

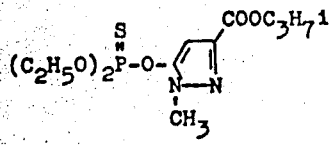

6. A compound according to claim 1 wherein such compound is 0,0-diethyl-0-[1-cyanoethyl-3-carboethoxy-4-chloropyrazol(5)yl]-thionophosphoric acid ester of the formula

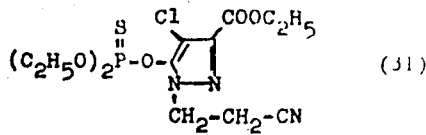

(31)

7. A compound according to claim 1 wherein such compound is 0,0-dimethyl-0-[1-methyl-3-N-methylcarbamoyl-pyrazol(5)yl]-thionophosphoric acid ester of the formula

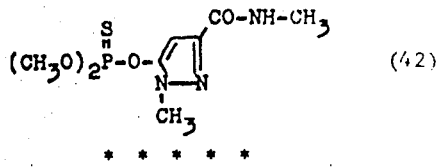

(42)

* * * * *